United States Patent
Kim et al.

(10) Patent No.: US 9,635,660 B2
(45) Date of Patent: Apr. 25, 2017

(54) DATA RECEIVING METHOD AND WIRELESS DEVICE

(71) Applicant: LG ELECTRONICS INC., Seoul (KR)

(72) Inventors: Hak Seong Kim, Anyang-si (KR); Han Byul Seo, Anyang-si (KR); Byoung Hoon Kim, Anyang-si (KR)

(73) Assignee: LG ELECTRONICS INC., Seoul (KR)

(*) Notice: Subject to any disclaimer, the term of this patent is extended or adjusted under 35 U.S.C. 154(b) by 199 days.

(21) Appl. No.: 14/358,685

(22) PCT Filed: Nov. 16, 2012

(86) PCT No.: PCT/KR2012/009758
§ 371 (c)(1),
(2) Date: May 15, 2014

(87) PCT Pub. No.: WO2013/073903
PCT Pub. Date: May 23, 2013

(65) Prior Publication Data
US 2014/0328301 A1 Nov. 6, 2014

Related U.S. Application Data

(60) Provisional application No. 61/560,742, filed on Nov. 16, 2011, provisional application No. 61/561,756, (Continued)

(51) Int. Cl.
*H04W 72/04* (2009.01)
*H04L 5/00* (2006.01)

(52) U.S. Cl.
CPC ......... *H04W 72/042* (2013.01); *H04L 5/0053* (2013.01); *H04L 5/0044* (2013.01); *H04L 5/0048* (2013.01)

(58) Field of Classification Search
None
See application file for complete search history.

(56) References Cited

U.S. PATENT DOCUMENTS

2011/0019776 A1* 1/2011 Zhang ................... H04L 5/0023
375/340
2012/0275400 A1* 11/2012 Chen .................... H04J 11/0033
370/329
(Continued)

FOREIGN PATENT DOCUMENTS

KR 10-2011-0027591 3/2011
KR 10-2011-0067025 6/2011
(Continued)

OTHER PUBLICATIONS

PCT International Application No. PCT/KR2012/009758, Written Opinion of the International Searching Authority dated Mar. 18, 2013, 1 page.

*Primary Examiner* — Charles C Jiang
*Assistant Examiner* — George Atkins, Jr.
(74) *Attorney, Agent, or Firm* — Lee, Hong, Degerman, Kang & Waimey

(57) ABSTRACT

Provided is a data receiving method in a wireless communication system and a wireless device using the same. A wireless device monitors a downlink control channel, and receives a downlink reference signal to be used in a demodulation of a downlink transmission block based on the resource to be used in the monitoring the downlink control channel.

10 Claims, 15 Drawing Sheets

Related U.S. Application Data filed on Nov. 18, 2011, provisional application No. 61/562,414, filed on Nov. 21, 2011.

(56) References Cited

U.S. PATENT DOCUMENTS

| | | | |
|---|---|---|---|
| 2013/0039284 A1* | 2/2013 | Marinier | H04L 5/001 370/329 |
| 2013/0064215 A1* | 3/2013 | Gao | H04L 5/0016 370/330 |
| 2013/0100901 A1* | 4/2013 | Shan | H04L 5/0048 370/329 |

FOREIGN PATENT DOCUMENTS

| | | |
|---|---|---|
| KR | 10-2011-0073334 | 6/2011 |
| KR | 10-2011-0082489 | 7/2011 |

* cited by examiner

DATA RECEIVING METHOD AND WIRELESS DEVICE

CROSS-REFERENCE TO RELATED APPLICATIONS

This application is the National Stage filing under 35 U.S.C. 371 of International Application No. PCT/KR2012/009758, filed on Nov. 16, 2012, which claims the benefit of U.S. Provisional Application Ser. No. 61/560,742 filed on Nov. 16, 2011, 61/561,756, filed on Nov. 18, 2011 and 61/562,414, filed on Nov. 21, 2011, the contents of which are all hereby incorporated by reference herein in their entirety.

BACKGROUND OF THE INVENTION

Field of the Invention

The present invention relates to wireless communications, and more particularly, to a method of receiving data in a wireless communication system, and a wireless device using the method.

Related Art

Long term evolution (LTE) based on 3rd generation partnership project (3GPP) technical specification (TS) release 8 is a promising next-generation mobile communication standard. Recently, LTE-advanced (LTE-A) based on 3GPP TS release 10 supporting multiple carriers is under standardization.

As disclosed in 3GPP TS 36.211 V10.2.0 (2011-06) "Evolved Universal Terrestrial Radio Access (E-UTRA); Physical Channels and Modulation (Release 10)", a physical channel of 3GPP LTE/LTE-A can be classified into a downlink channel, i.e., a physical downlink shared channel (PDSCH) and a physical downlink control channel (PDCCH), and an uplink channel, i.e., a physical uplink shared channel (PUSCH) and a physical uplink control channel (PUCCH).

To cope with increasing data traffic, various techniques are introduced to increase transmission capacity of a mobile communication system. For example, a multiple input multiple output (MIMO) technique using multiple antennas, a carrier aggregation technique supporting multiple cells, etc., are introduced.

The PDCCH designed in 3GPP LTE/LTE-A carries a variety of control information. With the diversification of a type of the control information and with the increase in an amount of the control information, scheduling flexibility is decreased when using only the existing PDCCH. In addition, an enhanced PDCCH (EPDCCH) is introduced to decrease an overhead caused by cell-specific reference signal (CRS) transmission.

Monitoring of the EPDCCH and data reception related thereto are not yet clearly specified.

SUMMARY OF THE INVENTION

The present invention provides a data receiving method in a wireless communication system, and a wireless device using the method.

In an aspect, a method of receiving data in a wireless communication system is provided. The method includes monitoring, by a wireless device, a downlink control channel, receiving, by the wireless device, downlink resource allocation information through the downlink control channel, receiving, by the wireless device, a downlink reference signal used in demodulation of a downlink transmission block based on a resource used in the monitoring of the downlink control channel, and receiving, by the wireless device, the downlink transmission block through a downlink shared channel based on the downlink resource allocation information.

The downlink control channel may be monitored in a search space defined by a physical resource block (PRB) pair.

A radio resource of the downlink reference signal may be determined in association with the search space.

The radio resource of the downlink reference signal may include at least any one of an antenna port used in reception of the downlink reference signal and a scramble identifier of the downlink reference signal.

In another aspect, a wireless device in a wireless communication system includes a radio frequency (RF) unit configured to transmit and receive a radio signal, and a processor operatively coupled to the RF unit and configured to monitor a downlink control channel, receive downlink resource allocation information through the downlink control channel, receive a downlink reference signal used in demodulation of a downlink transmission block based on a resource used in the monitoring of the downlink control channel, and receive the downlink transmission block through a downlink shared channel based on the downlink resource allocation information.

Even if there is no control information for a reference signal in a fallback operation, the reference signal can be received, and data related thereto can also be received. Therefore, communication reliability can be prevented from deterioration even if a channel state is changed.

DESCRIPTION OF EXEMPLARY EMBODIMENTS

A wireless device may be fixed or mobile, and may be referred to as another terminology, such as a user equipment (UE), a mobile station (MS), a mobile terminal (MT), a user terminal (UT), a subscriber station (SS), a personal digital assistant (PDA), a wireless modem, a handheld device, etc. The wireless device may also be a device supporting only data communication such as a machine-type communication (MTC) device.

A base station (BS) is generally a fixed station that communicates with the wireless device, and may be referred to as another terminology, such as an evolved-NodeB (eNB), a base transceiver system (BTS), an access point, etc.

Hereinafter, it is described that the present invention is applied according to a 3rd generation partnership project (3GPP) long term evolution (LTE) based on 3GPP technical specification (TS) release 8 or 3GPP LTE-advanced (LTE-A) based on 3GPP TS release 10. However, this is for exemplary purposes only, and thus the present invention is also applicable to various wireless communication networks. In the following description, LTE and/or LTE-A are collectively referred to as LTE.

The wireless device may be served by a plurality of serving cells. Each serving cell may be defined with a downlink (DL) component carrier (CC) or a pair of a DL CC and an uplink (UL) CC.

The serving cell may be classified into a primary cell and a secondary cell. The primary cell operates at a primary frequency, and is a cell designated as the primary cell when an initial network entry process is performed or when a network re-entry process starts or in a handover process. The primary cell is also called a reference cell. The secondary cell operates at a secondary frequency. The secondary cell may be configured after an RRC connection is established, and may be used to provide an additional radio resource. At least one primary cell is configured always. The secondary cell may be added/modified/released by using higher-layer signaling (e.g., a radio resource control (RRC) message).

A cell index (CI) of the primary cell may be fixed. For example, a lowest CI may be designated as the CI of the primary cell. It is assumed hereinafter that the CI of the primary cell is 0 and a CI of the secondary cell is allocated sequentially starting from 1.

Figure 1:
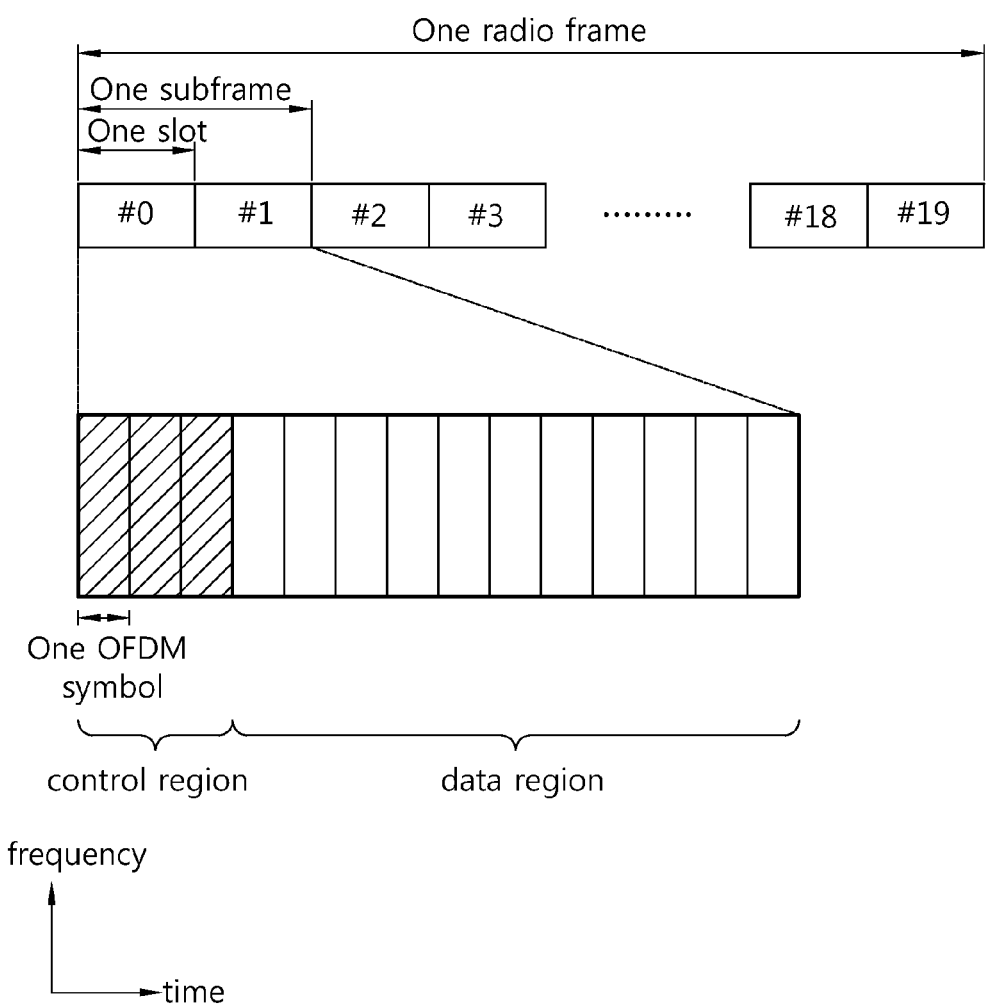
FIG. 1 shows a structure of a downlink (DL) radio frame in 3rd generation partnership project (3GPP) long term evolution-advanced (LTE-A).

FIG. 1 shows a structure of a DL radio frame in 3GPP LTE-A. The section 6 of 3GPP TS 36.211 V10.2.0 (2011-06) "Evolved Universal Terrestrial Radio Access (E-UTRA); Physical Channels and Modulation (Release 10)" may be incorporated herein by reference.

A radio frame includes 10 subframes indexed with 0 to 9. One subframe includes 2 consecutive slots. A time required for transmitting one subframe is defined as a transmission time interval (TTI). For example, one subframe may have a length of 1 millisecond (ms), and one slot may have a length of 0.5 ms.

One slot may include a plurality of orthogonal frequency division multiplexing (OFDM) symbols in a time domain. Since the 3GPP LTE uses orthogonal frequency division multiple access (OFDMA) in a downlink (DL), the OFDM symbol is only for expressing one symbol period in the time domain, and there is no limitation in multiple access schemes or terminologies. For example, the OFDM symbol may also be referred to as another terminology such as a single carrier frequency division multiple access (SC-FDMA) symbol, a symbol period, etc.

Although it is described that one slot includes 7 OFDM symbols for example, the number of OFDM symbols included in one slot may vary depending on a length of a cyclic prefix (CP). According to 3GPP TS 36.211 V10.2.0, in case of a normal CP, one slot includes 7 OFDM symbols, and in case of an extended CP, one slot includes 6 OFDM symbols.

A resource block (RB) is a resource allocation unit, and includes a plurality of subcarriers in one slot. For example, if one slot includes 7 OFDM symbols in a time domain and the RB includes 12 subcarriers in a frequency domain, one RB can include 7×12 resource elements (REs).

A DL subframe is divided into a control region and a data region in the time domain. The control region includes up to first four OFDM symbols of a first slot in the subframe. However, the number of OFDM symbols included in the control region may vary. A physical downlink control channel (PDCCH) and other control channels are allocated to the control region, and a physical downlink shared channel (PDSCH) is allocated to the data region.

As disclosed in 3GPP TS 36.211 V10.2.0, examples of a physical control channel in 3GPP LTE/LTE-A include a physical downlink control channel (PDCCH), a physical control format indicator channel (PCFICH), and a physical hybrid-ARQ indicator channel (PHICH).

The PCFICH transmitted in a first OFDM symbol of the subframe carries a control format indicator (CFI) regarding the number of OFDM symbols (i.e., a size of the control region) used for transmission of control channels in the subframe. A wireless device first receives the CFI on the PCFICH, and thereafter monitors the PDCCH.

Unlike the PDCCH, the PCFICH does not use blind decoding, and is transmitted by using a fixed PCFICH resource of the subframe.

The PHICH carries a positive-acknowledgement (ACK)/negative-acknowledgement (NACK) signal for an uplink hybrid automatic repeat request (HARQ). The ACK/NACK signal for uplink (UL) data on a PUSCH transmitted by the wireless device is transmitted on the PHICH.

A physical broadcast channel (PBCH) is transmitted in first four OFDM symbols in a second slot of a first subframe of a radio frame. The PBCH carries system information necessary for communication between the wireless device and a BS. The system information transmitted through the PBCH is referred to as a master information block (MIB). In comparison thereto, system information transmitted on the PDCCH is referred to as a system information block (SIB).

Control information transmitted through the PDCCH is referred to as downlink control information (DCI). The DCI may include resource allocation of the PDSCH (this is referred to as a downlink (DL) grant), resource allocation of a PUSCH (this is referred to as an uplink (UL) grant), a set of transmit power control commands for individual UEs in any UE group, and/or activation of a voice over Internet protocol (VoIP).

In 3GPP LTE/LTE-A, transmission of a DL transport block is performed in a pair of the PDCCH and the PDSCH. Transmission of a UL transport block is performed in a pair of the PDCCH and the PUSCH. For example, the wireless device receives the DL transport block on a PDSCH indicated by the PDCCH. The wireless device receives a DL resource assignment on the PDCCH by monitoring the PDCCH in a DL subframe. The wireless device receives the DL transport block on a PDSCH indicated by the DL resource assignment.

Figure 2:
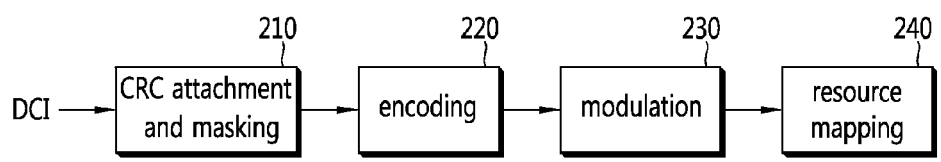
FIG. 2 is a block diagram showing a structure of a physical downlink control channel (PDCCH).

FIG. 2 is a block diagram showing a structure of a PDCCH.

The 3GPP LTE/LTE-A uses blind decoding for PDCCH detection. The blind decoding is a scheme in which a desired identifier is de-masked from a cyclic redundancy check (CRC) of a received PDCCH (referred to as a candidate PDCCH) to determine whether the PDCCH is its own control channel by performing CRC error checking.

A BS determines a PDCCH format according to DCI to be transmitted to a wireless device, attaches a CRC to control information, and masks a unique identifier (referred to as a radio network temporary identifier (RNTI)) to the CRC according to an owner or usage of the PDCCH (block 210).

If the PDCCH is for a specific wireless device, a unique identifier (e.g., cell-RNTI (C-RNTI)) of the wireless device may be masked to the CRC. Alternatively, if the PDCCH is for a paging message, a paging indication identifier (e.g., paging-RNTI (P-RNTI)) may be masked to the CRC. If the PDCCH is for system information, a system information identifier (e.g., system information-RNTI (SI-RNTI)) may be masked to the CRC. To indicate a random access response that is a response for transmission of a random access preamble of the wireless device, a random access-RNTI (RA-RNTI) may be masked to the CRC. To indicate a transmit power control (TPC) command for a plurality of wireless devices, a TPC-RNTI may be masked to the CRC.

When the C-RNTI is used, the PDCCH carries control information for a specific wireless device (such information is called UE-specific control information), and when other RNTIs are used, the PDCCH carries common control information received by all or a plurality of wireless devices in a cell.

The CRC-attached DCI is encoded to generate coded data (block 220). Encoding includes channel encoding and rate matching.

The coded data is modulated to generate modulation symbols (block 230).

The modulation symbols are mapped to physical resource elements (REs) (block 240). The modulation symbols are respectively mapped to the REs.

A control region in a subframe includes a plurality of control channel elements (CCEs). The CCE is a logical allocation unit used to provide the PDCCH with a coding rate depending on a radio channel state, and corresponds to a plurality of resource element groups (REGs). The REG includes a plurality of REs. According to an association relation of the number of CCEs and the coding rate provided by the CCEs, a PDCCH format and a possible number of bits of the PDCCH are determined.

One REG includes 4 REs. One CCE includes 9 REGs. The number of CCEs used to configure one PDCCH may be selected from a set {1, 2, 4, 8}. Each element of the set {1, 2, 4, 8} is referred to as a CCE aggregation level.

The BS determines the number of CCEs used in transmission of the PDCCH according to a channel state. For example, a wireless device having a good DL channel state can use one CCE in PDCCH transmission. A wireless device having a poor DL channel state can use 8 CCEs in PDCCH transmission.

A control channel consisting of one or more CCEs performs interleaving on an REG basis, and is mapped to a physical resource after performing cyclic shift based on a cell identifier (ID).

Figure 3:
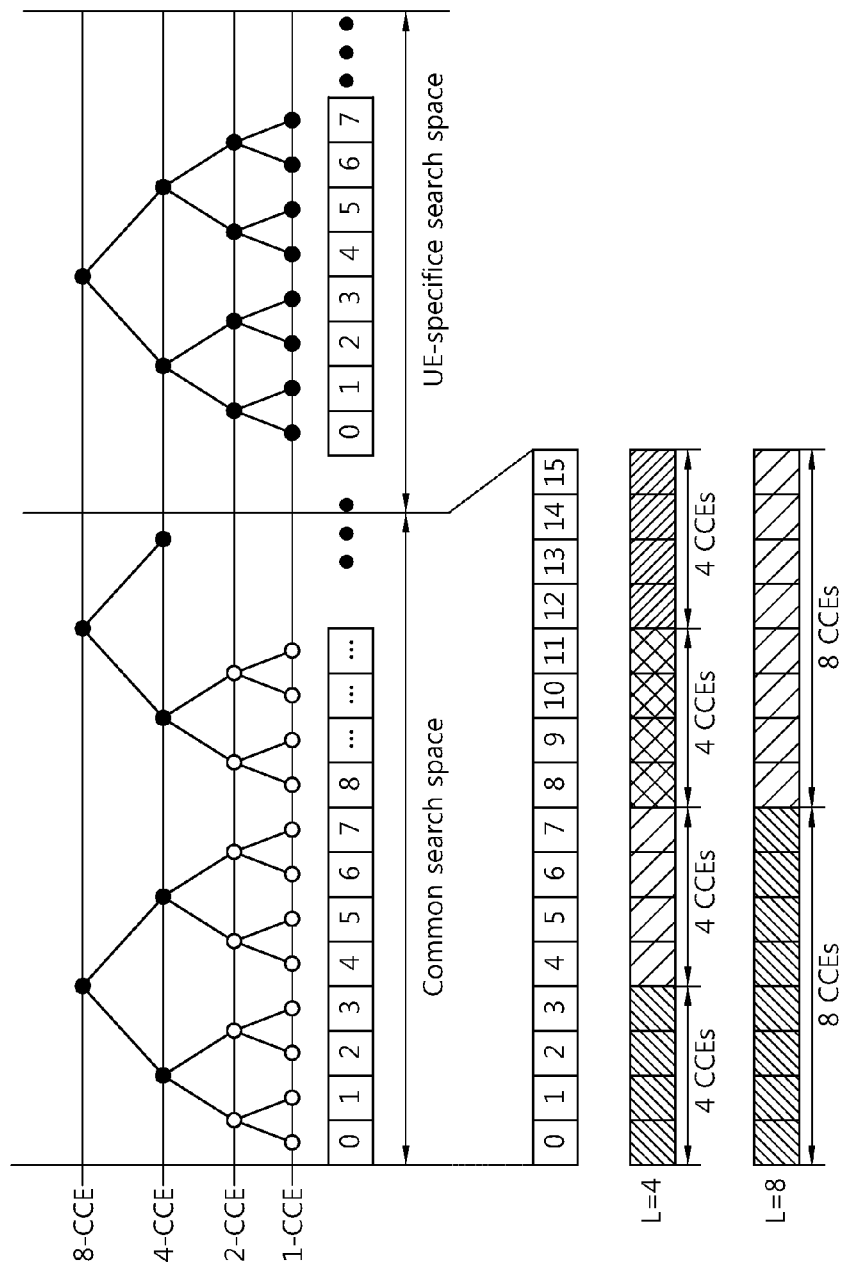
FIG. 3 shows an example of monitoring a PDCCH.

FIG. 3 shows an example of monitoring a PDCCH. The section 9 of 3GPP TS 36.213 V10.2.0 (2011-06) can be incorporated herein by reference.

The 3GPP LTE uses blind decoding for PDCCH detection. The blind decoding is a scheme in which a desired identifier is de-masked from a CRC of a received PDCCH (referred to as a candidate PDCCH) to determine whether the PDCCH is its own control channel by performing CRC error checking. A wireless device cannot know about a specific position in a control region in which its PDCCH is transmitted and about a specific CCE aggregation or DCI format used for PDCCH transmission.

A plurality of PDCCHs can be transmitted in one subframe. The wireless device monitors the plurality of PDCCHs in every subframe. Monitoring is an operation of attempting PDCCH decoding by the wireless device according to a format of the monitored PDCCH.

The 3GPP LTE uses a search space to reduce a load of blind decoding. The search space can also be called a monitoring set of a CCE for the PDCCH. The wireless device monitors the PDCCH in the search space.

The search space is classified into a common search space and a UE-specific search space. The common search space is a space for searching for a PDCCH having common control information and consists of 16 CCEs indexed with 0 to 15. The common search space supports a PDCCH having a CCE aggregation level of {4, 8}. However, a PDCCH (e.g., DCI formats 0, 1A) for carrying UE-specific information can also be transmitted in the common search space. The UE-specific search space supports a PDCCH having a CCE aggregation level of {1, 2, 4, 8}.

Table 1 shows the number of PDCCH candidates monitored by the wireless device.

TABLE 1

| Search Space Type | Aggregation level L | Size [In CCEs] | Number of PDCCH candidates | DCI formats |
|---|---|---|---|---|
| UE-specific | 1 | 6 | 6 | 0, 1, 1A, 1B, 1D, 2, 2A |
|  | 2 | 12 | 6 |  |
|  | 4 | 8 | 2 |  |
|  | 8 | 16 | 2 |  |
| Common | 4 | 16 | 4 | 0, 1A, 1C, 3/3A |
|  | 8 | 16 | 2 |  |

A size of the search space is determined by Table 1 above, and a start point of the search space is defined differently in the common search space and the UE-specific search space. Although a start point of the common search space is fixed irrespective of a subframe, a start point of the UE-specific search space may vary in every subframe according to a UE identifier (e.g., C-RNTI), a CCE aggregation level, and/or a slot number in a radio frame. If the start point of the UE-specific search space exists in the common search space, the UE-specific search space and the common search space may overlap with each other.

In a CCE aggregation level L∈{1,2,3,4}, a search space $S^{(L)}_k$ is defined as a set of PDCCH candidates. A CCE corresponding to a PDCCH candidate m of the search space $S^{(L)}_k$ is given by Equation 1 below.

$$L \cdot \{(Y_k + m') \bmod \lfloor N_{CCE,k}/L \rfloor\} + i \quad \text{[Equation 1]}$$

Herein, i=0, 1, . . . , L−1, m=0, . . . , $M^{(L)}$−1, and $N_{CCE,k}$ denotes the total number of CCEs that can be used for PDCCH transmission in a control region of a subframe k. The control region includes a set of CCEs numbered from 0 to $N_{CCE,k}$−1. $M^{(L)}$ denotes the number of PDCCH candidates in a CCE aggregation level L of a given search space.

If a carrier indicator field (CIF) is set to the wireless device, m'=m+$M^{(L)}n_{cif}$. Herein, $n_{cif}$ is a value of the CIF. If the CIF is not set to the wireless device, m'=m.

In a common search space, $Y_k$ is set to 0 with respect to two aggregation levels L=4 and L=8.

In a UE-specific search space of the aggregation level L, a variable $Y_k$ is defined by Equation 2 below.

$$Y_k = (A \cdot Y_{k-1}) \bmod D \quad \text{[Equation 2]}$$

Herein, $Y_{-1} = n_{RNTI} \neq 0$, A=39827, D=65537, k=floor($n_s/2$), and $n_s$ denotes a slot number in a radio frame.

When the wireless device monitors the PDCCH by using the C-RNTI, a search space and a DCI format used in monitoring are determined according to a transmission mode of the PDSCH. Table 2 below shows an example of PDCCH monitoring in which the C-RNTI is set.

TABLE 2

| Transmission mode | DCI format | search space | Transmission mode of PDSCH based on PDCCH |
|---|---|---|---|
| Mode 1 | DCI format 1A | common and UE specific | Single-antenna port, port 0 |
|  | DCI format 1 | UE specific | Single-antenna port, port 0 |
| Mode 2 | DCI format 1A | common and UE specific | Transmit diversity |
|  | DCI format 1 | UE specific | Transmit diversity |
| Mode 3 | DCI format 1A | common and UE specific | Transmit diversity |
|  | DCI format 2A | UE specific | CDD(Cyclic Delay Diversity) or Transmit diversity |
| Mode 4 | DCI format 1A | common and UE specific | Transmit diversity |
|  | DCI format 2 | UE specific | Closed-loop spatial multiplexing |
| Mode 5 | DCI format 1A | common and UE specific | Transmit diversity |
|  | DCI format 1D | UE specific | MU-MIMO(Multi-User Multiple Input Multiple Output) |
| Mode 6 | DCI format 1A | common and UE specific | Transmit diversity |
|  | DCI format 1B | UE specific | Closed-loop spatial multiplexing |
| Mode 7 | DCI format 1A | common and UE specific | If the number of PBCH transmission ports is 1, single antenna port, port 0, otherwise Transmit diversity |
|  | DCI format 1 | UE specific | Single antenna port, port 5 |
| Mode 8 | DCI format 1A | common and UE specific | If the number of PBCH transmission ports is 1, single antenna port, port 0, otherwise, Transmit diversity |
|  | DCI format 2B | UE specific | Dual layer transmission (port 7 or 8), or a single antenna port, port 7 or 8 |

The usage of the DCI format is classified as shown in Table 3 below.

TABLE 3

| DCI format | Contents |
|---|---|
| DCI format 0 | It is used for PUSCH scheduling. |
| DCI format 1 | It is used for scheduling of one PDSCH codeword. |
| DCI format 1A | It is used for compact scheduling and random access process of one PDSCH codeword. |
| DCI format 1B | It is used in simple scheduling of one PDSCH codeword having precoding information. |
| DCI format 1C | It is used for very compact scheduling of one PDSCH codeword. |
| DCI format 1D | It is used for simple scheduling of one PDSCH codeword having precoding and power offset information. |

TABLE 3-continued

| DCI format | Contents |
|---|---|
| DCI format 2 | It is used for PDSCH scheduling of UEs configured to a closed-loop spatial multiplexing mode. |
| DCI format 2A | It is used for PDSCH scheduling of UEs configured to an open-loop spatial multiplexing mode. |
| DCI format 3 | It is used for transmission of a TPC command of a PUCCH and a PUSCH having a 2-bit power adjustment. |
| DCI format 3A | It is used for transmission of a TPC command of a PUCCH and a PUSCH having a 1-bit power adjustment. |

Figure 4:
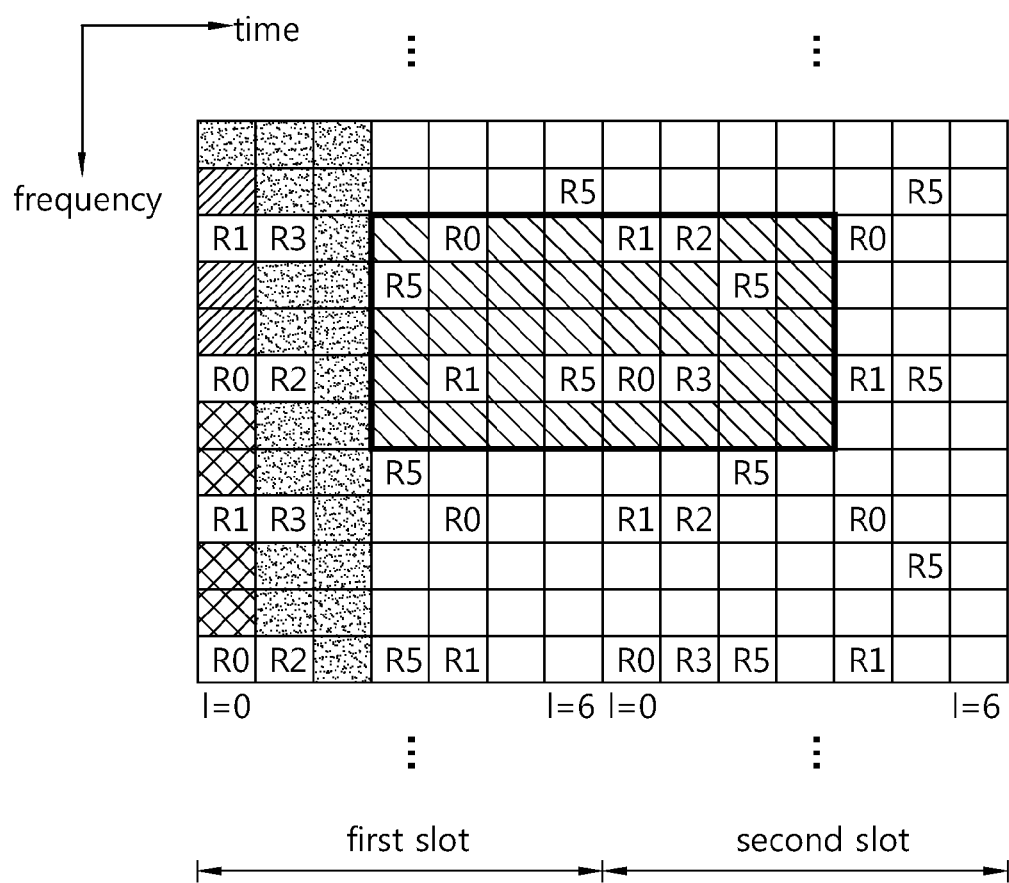
FIG. 4 shows an example of arranging a reference signal and a control channel in a DL subframe of 3GPP LTE.

FIG. 4 shows an example of arranging a reference signal and a control channel in a DL subframe of 3GPP LTE.

A control region (or a PDCCH region) includes first three OFDM symbols, and a data region in which a PDSCH is transmitted includes the remaining OFDM symbols.

A PCFICH, a PHICH, and/or a PDCCH are transmitted in the control region. A control format indictor (CFI) of the PCFICH indicates three OFDM symbols. A region excluding a resource in which the PCFICH and/or the PHICH are transmitted in the control region is a PDCCH region which monitors the PDCCH.

Various reference signals are transmitted in the subframe.

A cell-specific reference signal (CRS) may be received by all wireless devices in a cell, and is transmitted across a full downlink frequency band. In FIG. 4, 'R0' indicates a resource element (RE) used to transmit a CRS for a first antenna port, 'R1' indicates an RE used to transmit a CRS for a second antenna port, 'R2' indicates an RE used to transmit a CRS for a third antenna port, and 'R3' indicates an RE used to transmit a CRS for a fourth antenna port.

An RS sequence $r_{l,ns}(m)$ for a CRS is defined as follows.

$$r_{l,ns}(m) = \frac{1}{\sqrt{2}}(1 - 2 \cdot c(2m)) + j\frac{1}{\sqrt{2}}(1 - 2 \cdot c(2m+1)) \quad \text{[Equation 3]}$$

Herein, m=0, 1, ..., $2N_{maxRB}-1$. $N_{maxRB}$ is the maximum number of RBs. ns is a slot number in a radio frame. l is an OFDM symbol index in a slot.

A pseudo-random sequence c(i) is defined by a length-31 gold sequence as follows.

$$c(n) = (x_1(n+Nc) + x_2(n+Nc)) \bmod 2$$

$$x_1(n+31) = (x_1(n+3) + x_1(n)) \bmod 2$$

$$x_2(n+31) = (x_2(n+3) + x_2(n+2) + x_2(n+1) + x_2(n)) \bmod 2 \quad \text{[Equation 4]}$$

Herein, Nc=1600, and a first m-sequence is initialized as $x_1(0)=1$, $x_1(n)=0$, m=1, 2, ..., 30.

A second m-sequence is initialized as $c_{init} = 2^{10}(7(ns+1)+1+1)(2N^{cell}_{ID}+1)+2N^{cell}_{ID}+N_{CP}$ at a start of each OFDM symbol. $N^{cell}_{ID}$ is a physical cell identifier (PCI). $N_{CP}=1$ in a normal CP case, and $N_{CP}=0$ in an extended CP case.

A UE-specific reference signal (URS) is transmitted in the subframe. Whereas the CRS is transmitted in the entire region of the subframe, the URS is transmitted in a data region of the subframe and is used to demodulate the PDSCH. In FIG. 4, 'R5' indicates an RE used to transmit the URS. The URS is also called a dedicated reference signal (DRS) or a demodulation reference signal (DM-RS).

The URS is transmitted only in an RB to which a corresponding PDSCH is mapped. Although R5 is indicated in FIG. 4 in addition to a region in which the PDSCH is transmitted, this is for indicating a location of an RE to which the URS is mapped.

The URS is used only by a wireless device which receives a corresponding PDSCH. A reference signal (RS) sequence $r_{ns}(m)$ for the URS is equivalent to Equation 3. In this case, $m=0, 1, \ldots, 12N_{PDSCH,RB}-1$, and $N_{PDSCH,RB}$ is the number of RBs used for transmission of a corresponding PDSCH. A pseudo-random sequence generator is initialized as $c_{init}=(\text{floor}(ns/2)+1)(2N^{cell}_{ID}+1)2^{16}+n_{RNTI}$ at a start of each subframe. $n_{RNTI}$ is an identifier of the wireless device.

The aforementioned initialization method is for a case where the URS is transmitted through the single antenna, and when the URS is transmitted through multiple antennas, the pseudo-random sequence generator is initialized as $c_{init}=(\text{floor}(ns/2)+1)(2N^{cell}_{ID}+1)2^{16}+n_{SCID}$ at a start of each subframe. $n_{SCID}$ is a parameter acquired from a DL grant (e.g., a DCI format 2B or 2C) related to PDSCH transmission.

The URS supports multiple input multiple output (MIMO) transmission. According to an antenna port or a layer, an RS sequence for the URS may be spread into a spread sequence as follows.

TABLE 4

| Layer | [w(0) w(1) w(2) w(3)] |
|---|---|
| 1 | [+1 +1 +1 +1] |
| 2 | [+1 −1 +1 −1] |
| 3 | [+1 +1 +1 +1] |
| 4 | [+1 −1 +1 −1] |
| 5 | [+1 +1 −1 −1] |
| 6 | [−1 −1 +1 +1] |
| 7 | [+1 −1 −1 +1] |
| 8 | [−1 +1 +1 −1] |

A layer may be defined as an information path which is input to a precoder. A rank is a non-zero eigenvalue of a MIMO channel matrix, and is equal to the number of layers or the number of spatial streams. The layer may correspond to an antenna port for identifying a URS and/or a spread sequence applied to the URS.

Meanwhile, the PDCCH is monitored in an area restricted to the control region in the subframe, and a CRS transmitted in a full band is used to demodulate the PDCCH. As a type of control data is diversified and an amount of control data is increased, scheduling flexibility is decreased when using only the existing PDCCH. In addition, in order to decrease an overhead caused by CRS transmission, an enhanced PDCCH (EPDCCH) is introduced.

Figure 5:
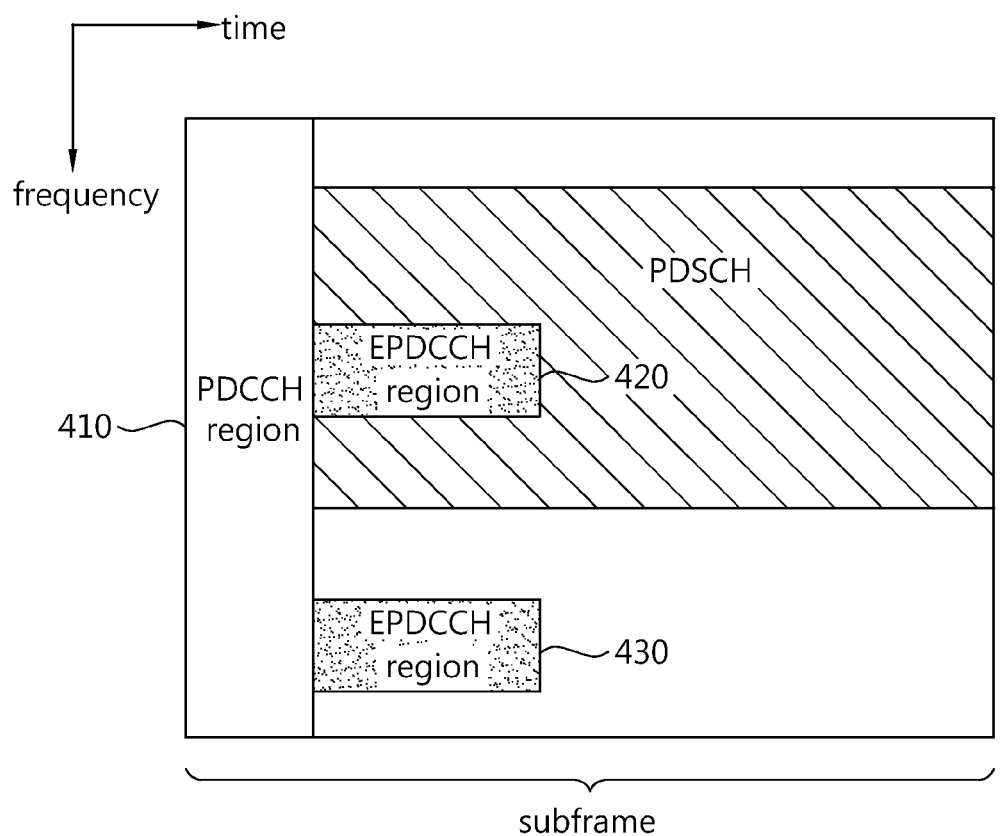
FIG. 5 is an example of a subframe having an enhanced PDCCH (EPDCCH).

FIG. 5 is an example of a subframe having an EPDCCH.

The subframe may include zero or one PDCCH region 410 and zero or more EPDCCH regions 420 and 430.

The EPDCCH regions 420 and 430 are regions in which a wireless device monitors the EPDCCH. The PDCCH region 410 is located in up to first four OFDM symbols of the subframe, whereas the EPDCCH regions 420 and 430 may be flexibly scheduled in an OFDM symbol located after the PDCCH region 410.

One or more EPDCCH regions 420 and 430 may be assigned to the wireless device. The wireless device may monitor EPDCCH data in the assigned EPDCCH regions 420 and 430.

The number/location/size of the EPDCCH regions 420 and 430 and/or information regarding a subframe for monitoring the EPDCCH may be reported by a BS to the wireless device by using a radio resource control (RRC) message or the like.

In the PDCCH region 410, a PDCCH may be demodulated on the basis of a CRS. In the EPDCCH regions 420 and 430, instead of the CRS, a DM-RS may be defined for demodulation of the EPDCCH. An associated DM-RS may be transmitted in the EPDCCH regions 420 and 430.

An RS sequence for the associated DM-RS is equivalent to Equation 3. In this case, $m=0, 1, \ldots, 12N_{RB}-1$, and $N_{RB}$ is a maximum number of RBs. A pseudo-random sequence generator may be initialized as $c_{init}=(\text{floor}(ns/2)+1)(2N_{EPDCCH,ID}+1)2^{16}+n_{EPDCCH,SCID}$ at a start of each subframe. ns is a slot number of a radio frame. $N_{EPDCCH,ID}$ is a cell index related to a corresponding EPDCCH region. $n_{EPDCCH,SCID}$ is a parameter given from higher layer signaling.

Each of the EPDCCH regions 420 and 430 may be used to schedule a different cell. For example, an EPDCCH in the EPDCCH region 420 may carry scheduling information for a primary cell, and an EPDCCH in the EPDCCH region 430 may carry scheduling information for a secondary cell.

When the EPDCCH is transmitted through multiple antennas in the EPDCCH regions 420 and 430, the same precoding as that used in the EPDCCH may be applied to a DM-RS in the EPDCCH regions 420 and 430.

Comparing with a case where the PDCCH uses a CCE as a transmission resource unit, a transmission resource unit for the EPDCCH is called an enhanced control channel element (ECCE). An aggregation level may be defined as a resource unit for monitoring the EPDCCH. For example, when 1 ECCE is a minimum resource for the EPDCCH, it may be defined as an aggregation level L={1, 2, 4, 8, 16}.

Now, resource allocation for an EPDCCH will be described.

The EPDCCH is transmitted by using one or more ECCEs. The ECCE includes a plurality of enhanced resource element groups (EREGs). The ECCE may include 4 EREGs or 8 EREGs according to a CP and a subframe type based on a time division duplex (TDD) DL-UL configuration. For example, the ECCE includes 4 EREGs in a normal CP case, and includes 8 EREGs in an extended CP case.

A physical resource block (PRB) pair is 2 PRBs having the same RB number in one subframe. The PRB pair is a first PRB of a first slot and a second PRB of a second slot in the same frequency domain. In the normal CP case, the PRB pair includes 12 subcarriers and 14 OFDM symbols, and thus includes 168 resource elements (REs).

An EPDCCH search space may be configured with one or a plurality of PRB pairs. One PRB pair includes 16 EREGs. Therefore, if the ECCE includes 4 EREGs, the PRB pair includes 4 ECCEs, and if the ECCE includes 8 EREGs, the PRB pair includes 2 ECCEs.

Figure 6:
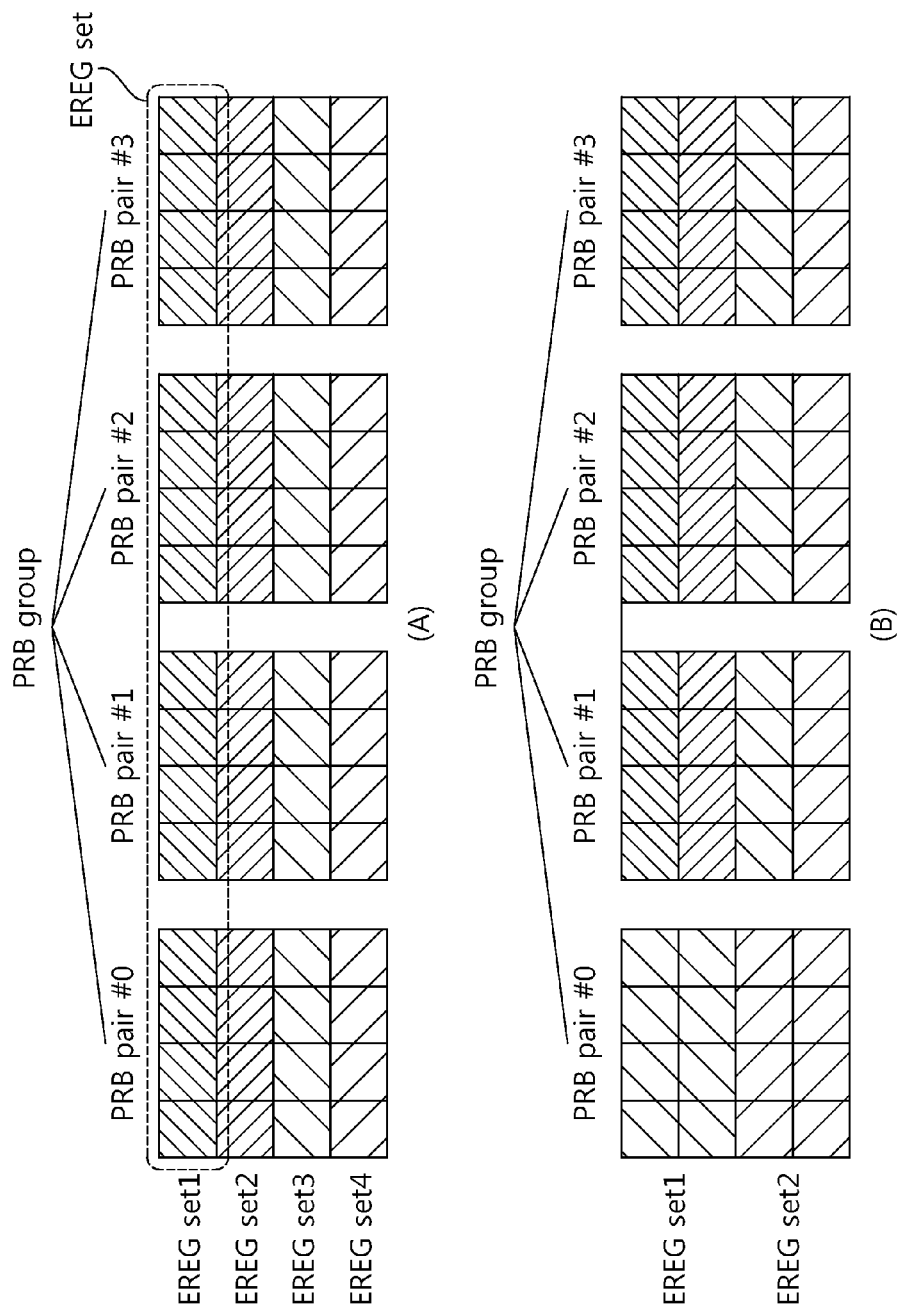
FIG. 6 shows an example of a physical resource block (PRB) pair structure.

FIG. 6 shows an example of a PRB pair structure. Although it is shown herein that a PRB group includes 4 PRB pairs, there is no restriction in the number of PRB pairs.

A subfigure (A) of FIG. 6 shows an EREG set when an ECCE includes 4 EREGs. A subfigure (B) of FIG. 6 shows an EREG set when an ECCE includes 8 EREGs.

It is assumed hereinafter that the ECCE includes 4 EREGs unless otherwise specified.

An EPDCCH supports localized transmission and distributed transmission. In the localized transmission, an EREG constituting one ECCE is transmitted in one PRB pair. In the distributed transmission, an EREG constituting one ECCE is transmitted in a plurality of PRB pairs.

Figure 7:
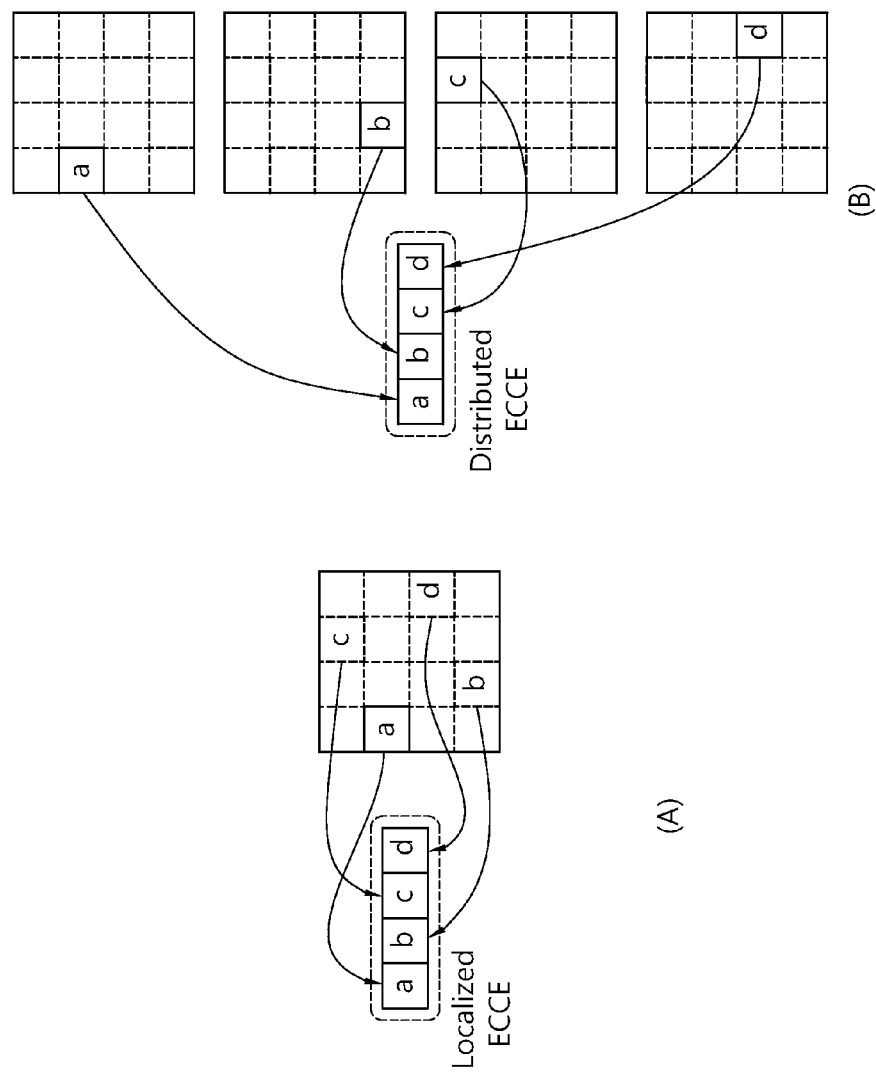
FIG. 7 shows an example of localized transmission and distributed transmission.

FIG. 7 shows an example of localized transmission and distributed transmission. A subfigure (A) of FIG. 7 shows an example of ECCE-to-EREG mapping based on localized transmission. A localized ECCE is an ECCE used in the localized transmission. A subfigure (B) of FIG. 7 shows an example of ECCE-to-EREG mapping based on distributed transmission. A distributed ECCE is an ECCE used in the distributed transmission.

An EREG set is a set of EREGs used to construct the localized ECCE or the distributed ECCE. That is, the ECCE may include EREGs belonging to the same EREG set.

Now, transmission of a DM RS in association with an EPDCCH will be described according to an embodiment of the present invention.

To obtain a precoding gain, the EPDCCH is demodulated on the basis of the DM RS, unlike a PDCCH demodulated based on a CRS.

An RS sequence $r_{ns}(m)$ for a DM RS associated with the EPDCCH is equivalent to Equation 3. In this case, m=0, 1, . . . , $12N_{RB}-1$, and $N_{RB}$ is a maximum number of RBs. A pseudo-random sequence generator may be initialized as $c_{init}=(floor(ns/2)+1)(2N_{EPDCCH,ID}+1)2^{16}+n_{EPDCCH,SCID}$ at a start of each subframe. ns is a slot number of a radio frame. $N_{EPDCCH,ID}$ is a cell index related to a corresponding EPDCCH region. $n_{EPDCCH,SCID}$ is a scrambling identify (SCID) given from higher layer signaling.

Figure 8:
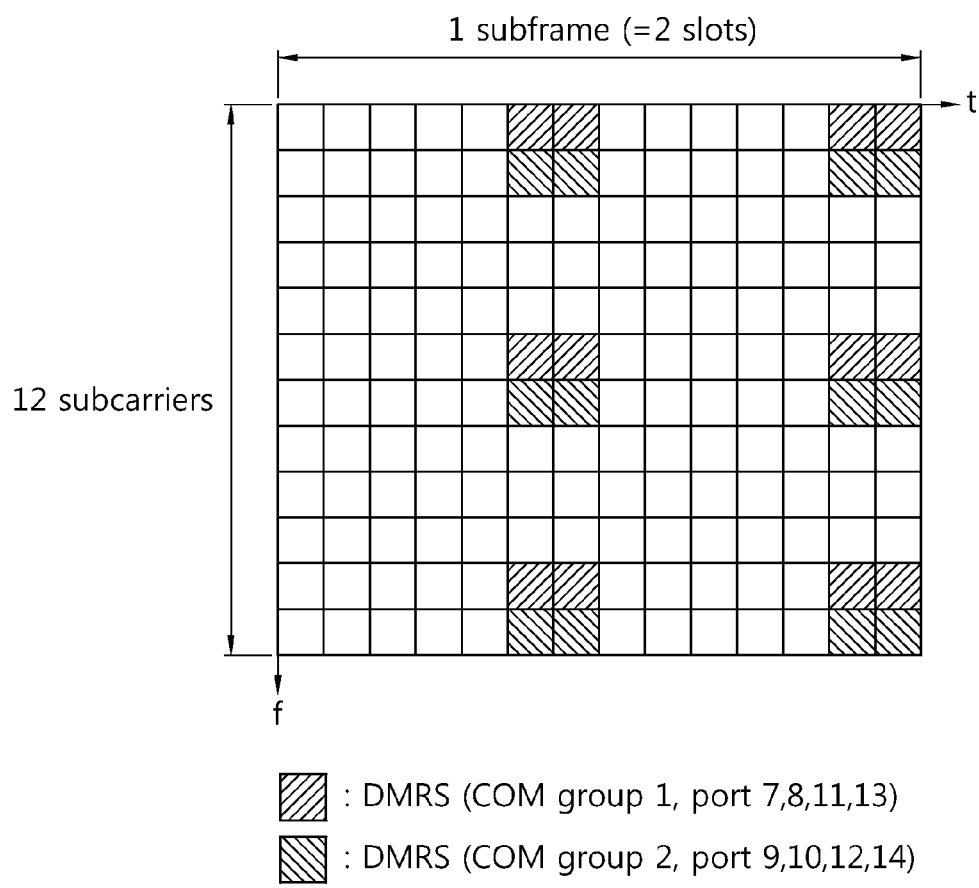
FIG. 8 shows an example of resource element (RE) mapping for a demodulation reference signal (DM RS).

FIG. 8 shows an example of RE mapping for a DM RS.

The DM RS may be used to perform channel estimation by applying a spreading factor K in a different manner. In a normal CP case, the spreading factor is K=4. RE mapping in the normal CP case is shown in FIG. 8. In an extended CP case, the spreading factor is K=2.

When an antenna port for a DM RS is p∈{107, 108, 109, 110}, an example of a spreading sequence with a spreading factor K=4 is as follows.

TABLE 5

| Antenna port p | [$w_p(0)$ $w_p(1)$ $w_p(2)$ $w_p(3)$] |
|---|---|
| 107 | [+1 +1 +1 +1] |
| 108 | [+1 −1 +1 −1] |
| 109 | [+1 +1 +1 +1] |
| 110 | [+1 −1 +1 −1] |

When an RS sequence $r_{ns}(m)$ is mapped to a symbol $a^{(p)}_{k,l}$ by using PRB $n_{PRB}$, RE mapping may be expressed by the following equation.

$$a^{(p)}_{k,l} = w_p(l') \cdot r(3 \cdot l' \cdot N_{RB}^{max,DL} + 3 \cdot n_{PRB} + m') \quad \text{[Equation 5]}$$

Herein, $$w_p(i) = \begin{cases} \overline{w}_p(i) & (m' + n_{PRB}) \bmod 2 = 0 \\ \overline{w}_p(3-i) & (m' + n_{PRB}) \bmod 2 = 1 \end{cases}$$

$$k = 5m' + N_{sc}^{RB} n_{PRB} + k'$$

$$k' = \begin{cases} 1 & p \in \{107, 108\} \\ 0 & p \in \{109, 110\} \end{cases}$$

$l = l' \bmod 2 + 5$ if not in a special subframe $$l' = \begin{cases} 0, 1 & \text{if } n_s \bmod 2 = 0 \text{ and not in special subframe} \\ 2, 3 & \text{if } n_s \bmod 2 = 1 \text{ and not in special subframe} \end{cases}$$

$m' = 0, 1, 2$

An example of a spreading sequence with a spreading factor K=2 is as follows.

TABLE 6

| Antenna port p | [$w_p(0)$ $w_p(1)$] |
|---|---|
| 107 | [+1 +1] |
| 108 | [−1 +1] |

As shown in Table 5 and Table 6, the wireless device recognizes that the spreading factor is 4 as to an antenna port p∈{107, 108, 109, 110}, and recognizes that the spreading factor is 2 as to an antenna port p∈{107, 108}. If the antenna factor is 2, the wireless device may estimate a channel through time interpolation after despreading a DM RS of a first slot and a DM RS of a second slot by using a spreading sequence with K=2. If K=4, the channel may be estimated by despreading all subframes by using a spreading sequence with K=4. A channel estimation process differs depending on the spreading factor. When using K=2, a gain can be acquired at a high mobility through the time interpolation, and when using K=4, more wireless devices or a higher rank can be supported.

As described above, the EPDCCH is transmitted through one PRB pair. For example, one PRB pair includes 168 REs in a normal CP case, which means that up to 4 ECCEs can be included. In case of using an aggregation level L=1, four EPDCCHs can be transmitted in the PRB pair. If one ECCE is divided into two sub-CCEs to obtain a frequency diversity gain, up to 8 EPDCCHs can be transmitted in one PRB pair. It is considered herein that K=4.

If a PDCCH region occupies up to 3 OFDM symbols in a corresponding subframe and if an overhead of a CRS and/or a URS and a DM RS is considered, resources that can be used in the EPDCCH are decreased. When the number of available ECCEs is decreased and if the number of EPD-CCHs (or the number of wireless devices) that can be multiplexed to one PRB pair is decreased, there may be a need to use K=2.

As described above, if a small spreading factor is used, a gain can be acquired at a high mobility. Therefore, a criterion on whether the wireless device uses K=2 or K=4 is required. Alternatively, information regarding the spreading factor may be reported by a BS to the wireless device by using an RRC message or the like.

Hereinafter, it is assumed in a normal CP case that K=2 if the number of wireless devices is less than or equal to 4, and K=4 if the number of wireless devices is greater than or equal to 5. It is assumed in an extended CP case that K=2 if the number of wireless devices is less than or equal to 2, and K=4 if the number of wireless devices is greater than or equal to 3. The number of wireless devices and the spreading factor in use are for exemplary purposes only.

Hereinafter, an ECCE may imply a minimum resource unit required for one E-PDCCH in one PRB pair.

Information regarding at least any one of the followings is required for monitoring of the EPDCCH.

(1) Spreading Factor

A BS may report which spreading factor is used for a corresponding subframe. The BS may perform signaling to indicate which spreading factor is used between a spreading factor 2 and a spreading factor 4.

The signaling may be performed with 1-bit information. The BS and/or a wireless device may determine the spreading factor on the basis of the number of EPDCCHs that can be transmitted in a PRB pair or the number of antenna ports in use, etc.

(2) The (Maximum) Number of ECCEs Included in One PRB Pair

The BS may randomly adjust the number of ECCEs included in one PRB pair according to a situation, and may report to the wireless device the number of ECCEs.

The wireless device may estimate the number of EPDCCH candidates in a corresponding PRB pair according to the number of ECCEs, may determine the spreading factor on the basis thereof, and may monitor the EPDCCH.

(3) The Number of EPDCCHs Included in One PRB Pair or the Number of Wireless Devices to be Monitored in One PRB Pair The BS may report information regarding the number of EPDCCHs (or the number of wireless devices) multiplexed to a corresponding PRB pair. The wireless device may determine the spreading factor on the basis of this information.

(4) The Number of Antenna Ports or an Antenna Port Number Used in the PRB Pair

The BS may report information regarding the number of antenna ports used in transmission of the EPDCCH in a corresponding PRB pair. The wireless device may determine the spreading factor on the basis of the number of antenna ports or the antenna port number.

The items (1) to (4) above may vary depending on a subframe. Information regarding a subframe set to which the spreading factor is applied may be reported by the BS to the wireless device. For example, a first subframe set may use K=2, and a second subframe set may use K=4.

Meanwhile, without additional signaling, the wireless device may estimate the spreading factor on the basis of existing information.

In order for the wireless device to determine the spreading factor by using the existing information, the followings are proposed.

First, all available REs that can be known by using the existing information are used as the EPDCCH. The existing information may include the number of OFDM symbols of a PDCCH region that can be known through a PCFICH, whether to transmit a CRS, whether to configure a special subframe (in particular, a length of DwPTS) of TDD, etc. If the number of available REs is acquired on the basis of the existing information, the wireless device may acquire the number of ECCEs in a corresponding PRB pair. For example, it is acquired by: floor (the number of available REs/the number of REs for the ECCE).

Second, the spreading factor 4 is used if the number of ECCEs in one PRB pair exceeds a predetermined threshold.

Although the above assumption is based on a normal CP case, if a spreading sequence with K=4 is defined in an extended CP case, it may also be applied to the extended CP case.

In order to decrease an overhead caused by a DM RS when the number of available REs is decreased, a scrambling identity (SCID) which is a parameter used in generation of an RS sequence may be used. For example, in the normal CP case, up to 4 ECCEs are included in one PRB pair, which means that 4 antenna ports may be used in transmission of the EPDCCH by using an overhead of 24 REs per PRB pair (i.e., K=2). However, in a case where a PDCCH region is defined and the number of OFDM symbols that can be used in the EPDCCH in the PRB pair is decreased, if it is difficult to manage an overhead of 24 REs, the maximum number of DM RSs may be maintained without an additional DM RS by allowing to use different SCIDs. For example, if the number of available OFDM symbols is less than or equal to a specific value, up to 4 DM RSs may be transmitted by using two antenna ports and two SCIDs. For example, SCI=0 is used when using all of 4 antenna ports {107, 108, 109, 110}. If the OFDM symbols are not sufficient, two antenna ports {107, 108} and SCID=0, 1 may be used. This may be more effective in an extended CP case in which only antenna ports {107, 108} are defined. If one PRB pair includes 4 ECCEs in the extended CP case and up to 4 DM RSs are required, two antenna ports and 2 SCIs may be properly combined to configure up to 4 DM RSs.

Overhead information required by the wireless device to decode the EPDCCH may be given by the BS or may be estimated implicitly. For example, a DM RS overhead assumption may change depending on the maximum number of ECCEs included in one PRB pair (or the maximum number of wireless devices). If the maximum number of ECCEs is greater than or equal to a specific value, the EPDCCH may be monitored by setting the DM RS overhead to a maximum value (e.g., 24 REs). For example, if the BS reports to the wireless device that the maximum number of ECCEs is 2, the wireless device may monitor the EPDCCH by assuming the DM RS overhead to 12 REs. If the maximum number of ECCEs exceeds 2, the wireless device may assume the DM RS overhead to 24 REs. Alternatively, a method may be used in which the number of available REs is estimated by using system information or the like, and if the number of available REs exceeds a specific value, the DM RS overhead is assumed to 24 REs.

According to one embodiment of the present invention, the DM RS overhead assumption may differ depending on an antenna port used in decoding of the EPDCCH. This is because it may be unnecessary to maintain DM RS overhead to 24 REs in a corresponding PRB pair if the E-PDCCH is transmitted through an antenna port 107 or 108. For example, this is because, if the remaining REs are used in PDSCH transmission, there is no need to transmit another EPDCCH by using another DM RS such as the antenna port 109 or 110.

Figure 9:
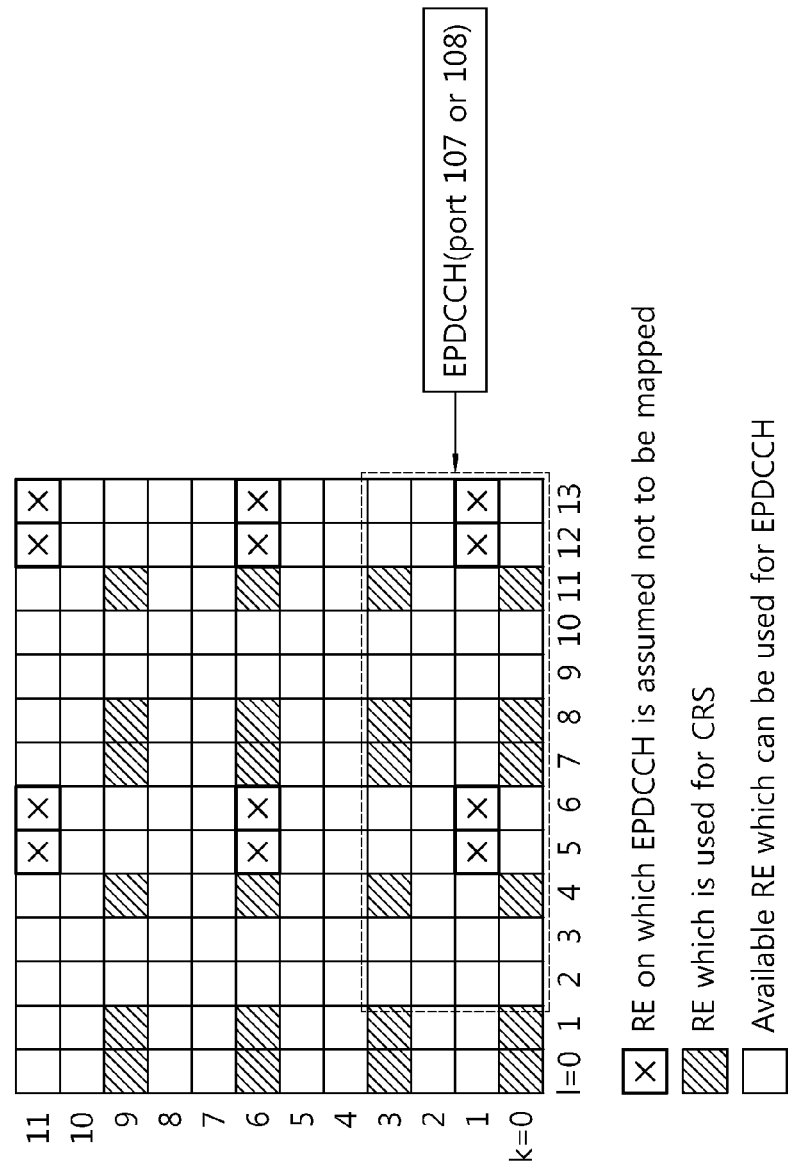
FIG. 9 shows an example of a 12 RE overhead assumption.

FIG. 9 shows an example of a 12 RE overhead assumption. If blind decoding is performed on an antenna port 107/108 to avoid an increase in an unnecessary DM RS overhead, the 12 RE overhead may be assumed, and it may be assumed that a DM RS of an antenna port 109/110 does not exist.

Figure 10:
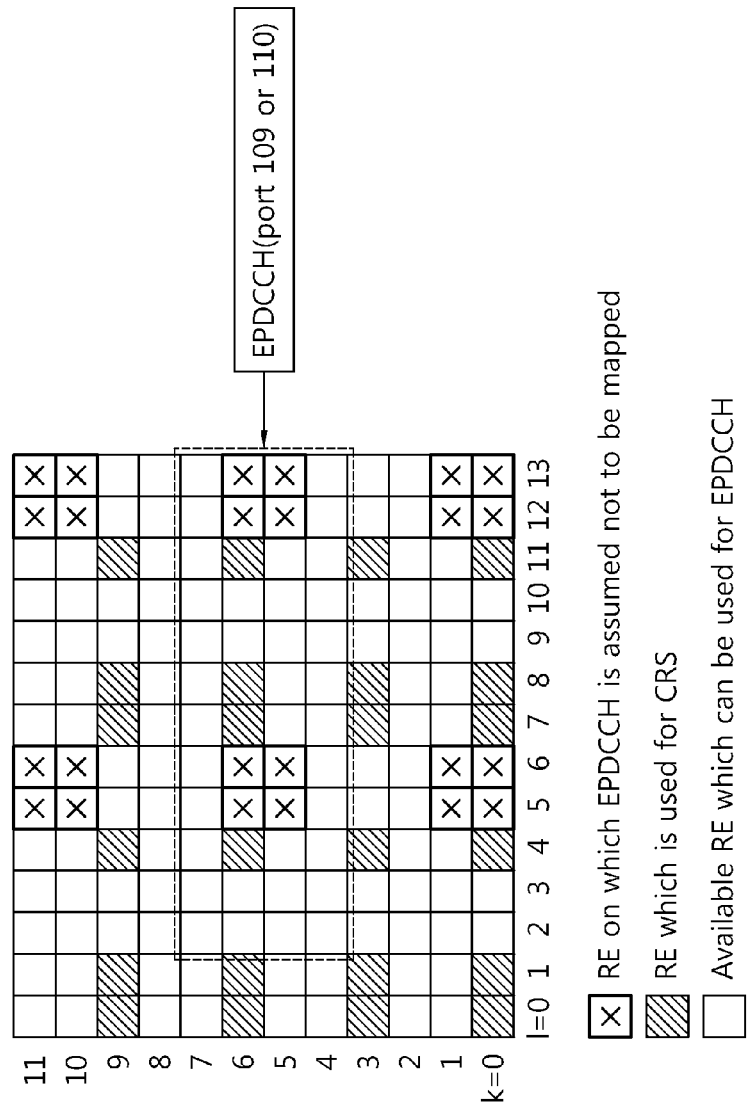
FIG. 10 shows an example of a 24 RE overhead assumption.

FIG. 10 shows an example of a 24 RE overhead assumption. When blind decoding is performed on an antenna port 109/110, the 24 RE overhead may be assumed. It is assumed that a DM RS of an antenna port 107/108 exists.

According to another embodiment of the present invention, a DM RS overhead assumption may vary depending on how many REs are occupied by an EPDCCH in a PRB pair. If one EPDCCH region occupies a great portion in all resources of the PRB pair, a possibility that other EPDCCHs co-exist is not high, and thus it is not necessary to assume the existence of a DM RS of another antenna port. For example, when the wireless device monitors the EPDCCH through the antenna port 107/108, if it is assumed that the number of ECCEs constituting one EPDCCH and transmitted in the PRB pair is greater than or equal to a specific number, a DM RS overhead is preferably decreased by assuming that a DM RS of the port 109/110 does not exist in the PRB pair. Likewise, when the wireless device monitors the EPDCCH through the antenna port 109/110, if it is assumed that the number of ECCEs constituting one EPDCCH and transmitted in the PRB pair is greater than or equal to a specific number, the DM RS overhead is preferably decreased by assuming that a DM RS of the port 107/108 does not exist in the PRB pair.

On the other hand, if the EPDCCH is monitored by occupying a small amount of resources, there is a high possibility that an EPDCCH for another wireless device exists. Therefore, it is preferably assumed that a DM RS of another CDM group exists.

Figure 11:
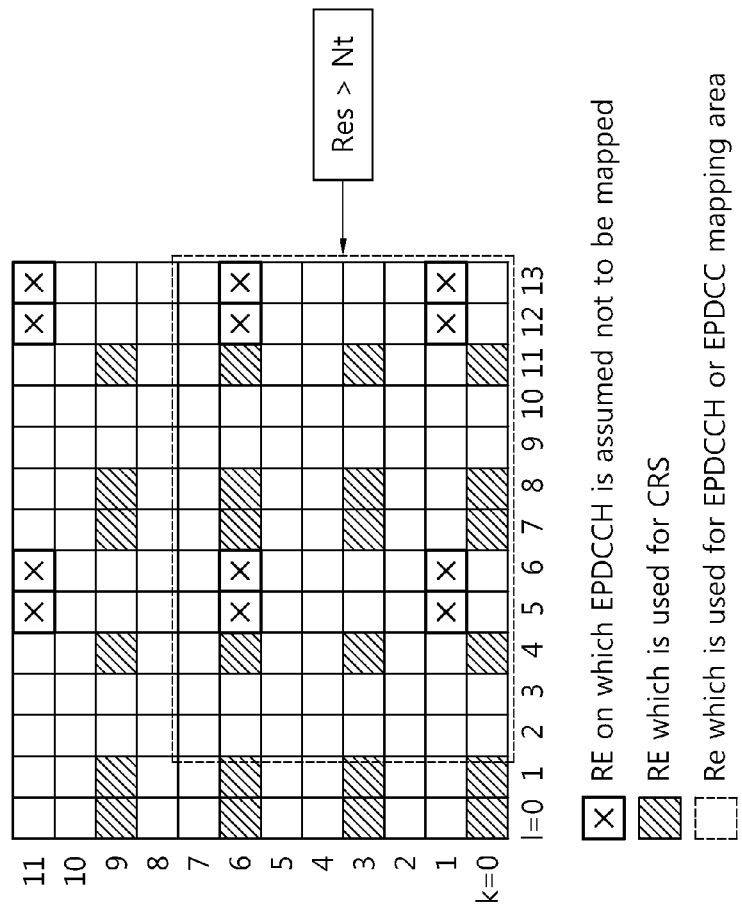
FIG. 11 shows an example of a 12 RE overhead assumption.
Figure 12:
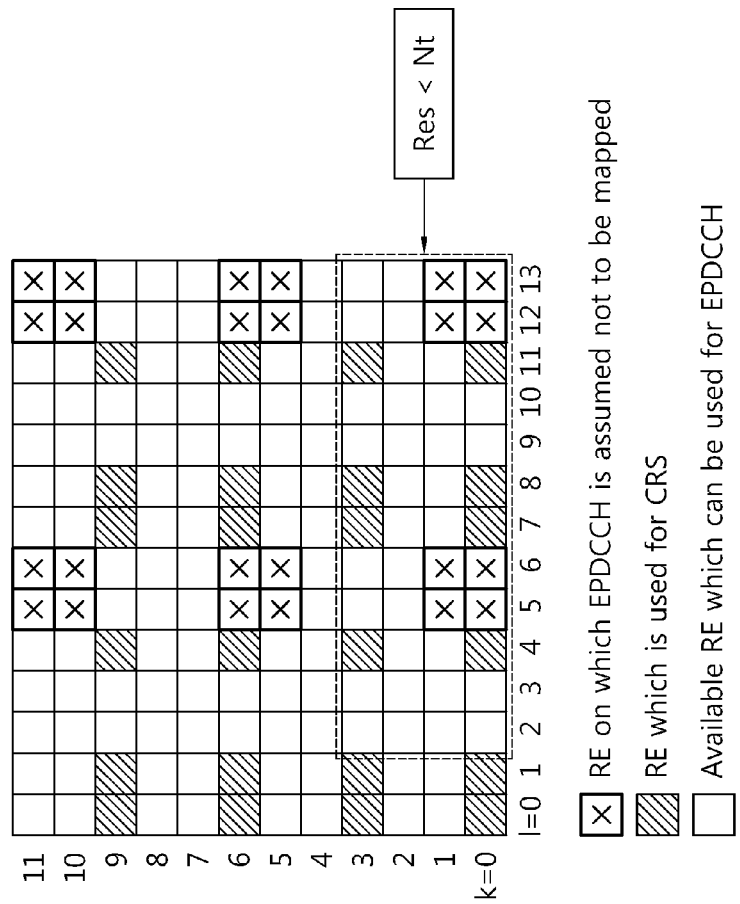
FIG. 12 shows an example of a 24 RE overhead assumption.
Figure 13:
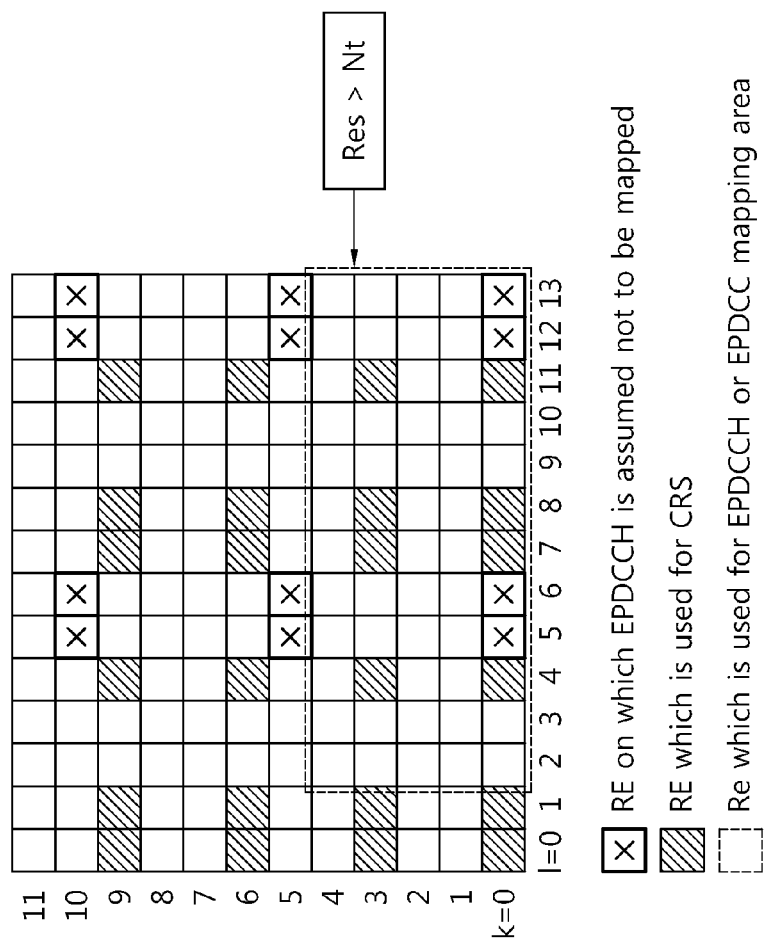
FIG. 13 shows another example of a 12 RE overhead assumption.

FIG. 11 shows an example of a 12 RE overhead assumption. If the number Res of REs used by an EPDCCH is greater than a threshold Nt, it is assumed that a DM RS overhead is 12 REs. FIG. 12 shows an example of a 24 RE overhead assumption. If the number Res of REs used by an EPDCCH is less than a threshold Nt, it is assumed that a DM RS overhead is 24 REs. FIG. 13 shows another example of a 12 RE overhead assumption.

According to another embodiment of the present invention, a DM RS overhead may be assumed differently according to an antenna port and a resource of an EPDCCH. For example, if the antenna port 107/108 is used and the number Res of REs used by the EPDCCH is greater than the threshold Nt, it may be assumed that the DM RS overhead is 12 REs. If the antenna port 109/110 is used and the number Res of REs used by the EPDCCH is less than the threshold Nt, it may be assumed that the DM RS overhead is 24 REs.

Now, monitoring of an EPDCCH based on a fallback operation will be described.

According to the aforementioned Table 2 and the section 7.1 of 3GPP TS 36.213 V10.2.0 (2011-06), a type of a DCI format to be monitored differs depending on a transmission mode. This is called a transmission mode (TM) dependent DCI format. Even if there is a designated transmission mode, the wireless device monitors a DCI format (e.g., DCI format 1A) designated as a default when a channel situation or the like deteriorates, which is called a fallback operation. The designated DCI format is called a fallback DCI format. According to Table 2, the DCI format 1A which is the fallback DCI format is monitored always irrespective of the transmission mode.

The conventional PDCCH is demodulated on the basis of a CRS, whereas the EPDCCH is demodulated on the basis of a DM RS. The EPDCCH may be more effectively decoded according to the DM RS overhead assumption.

When the fallback operation is performed, the EPDCCH may be monitored as to the fallback DCI format. However, when the fallback DCI format is the DCI format 1A, a field capable of indicating an antenna port and a SCID for the DM RS is not defined in the DCI format 1A. That is, the DCI format 1A includes an RB allocation, but does not include information on the SCID. Therefore, the wireless device cannot know an SCID of a URS for a PDSCH, which may result in a problem in that the wireless device cannot decode the PDSCH. Accordingly, an additional assumption is required to use the fallback DCI format of the EPDCCH as the DCI format 1A.

How to decode the PDSCH is proposed when an antenna port for the DM RS of the EPDCCH is 109/110 in the fallback operation.

Figure 14:
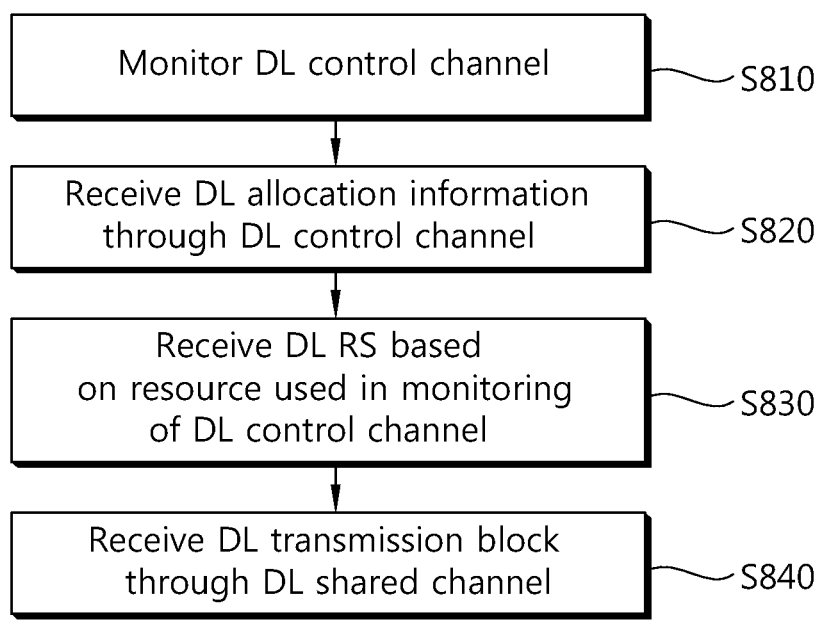
FIG. 14 shows a data receiving method according to an embodiment of the present invention.

FIG. 14 shows a data receiving method according to an embodiment of the present invention.

In step S810, a wireless device monitors a DL control channel (e.g., EPDCCH).

In step S820, the wireless device receives DL resource allocation information through the EPDCCH. For example, according to a fallback operation, the DL resource allocation information may be a DCI format 1A.

In step S830, the wireless device receives a DL RS used in demodulation of a DL transmission block on the basis of a resource used in monitoring of the EPDCCH. The DCI format 1A does not have information on an antenna port and/or an SCID for a URS of a PDSCH. Therefore, the wireless device may determine information regarding a radio resource (e.g., an antenna port and/or an SCID) for the URS of the PDSCH on the basis of a monitoring resource of the EPDCCH. The wireless device may receive the URS on the basis of the determined information.

In step S840, the wireless device receives the DL transmission block through the PDSCH on the basis of the DL resource allocation information.

The antenna port and/or the SCID for the URS of the PDSCH may be determined in association with an EPDCCH search space. The antenna port and/or the SCID for the URS of the PDSCH may be determined based on at least any one of a starting point of the EPDCCH search space, the number of ECCEs, a location of the ECCE, and the antenna port. The antenna port and/or the SCID for the URS of the PDSCH may be determined based on an ECCE index by which a corresponding EPDCCH is detected.

For example, assume that the EPDCCH is multiplexed with MU-MIMO. If an antenna port 107 of a specific PRB pair is used in the EPDCCH search space and if the DCI format 1A is a fallback DCI format, a first wireless device may assume that an antenna port for the URS of the PDSCH is a specific antenna port (e.g., an antenna port 7). If an antenna port 108 is used in the EPDCCH search space and if the DCI format 1A is the fallback DCI format, a second wireless device multiplexed in the same PRB pair may assume that the antenna port for the URS of the PDSCH is another antenna port (e.g., an antenna port 9).

For example, it is necessary to assume a DM RS overhead when the URS of the PDSCH is designated to the antenna port 9. When the antenna port 9 is used, the overhead may be agreed in advance to, for example, 12 REs or 24 REs.

If it is assumed that the overhead is 24 REs even though a rank is 1 or 2, resources may be wasted. Thus, if the rank is less than or equal to a specific value, a lower overhead (e.g., 12 REs) may be assumed.

The overhead may be designated on the basis of an antenna port. For example, the 12 REs may be assumed if the antenna port 7, 8 is used, and the 24 REs may be assumed if the antenna port 9, 10 is used.

The DL resource allocation may differ depending on a DL control channel. For example, in case of the DCI format 1A, distributed virtual resource block (DVRB) mapping or slot hopping is supported. However, when the PDSCH is demodulated with the URS by using the EPDCCH, the slot hopping may not be supported.

Figure 15:
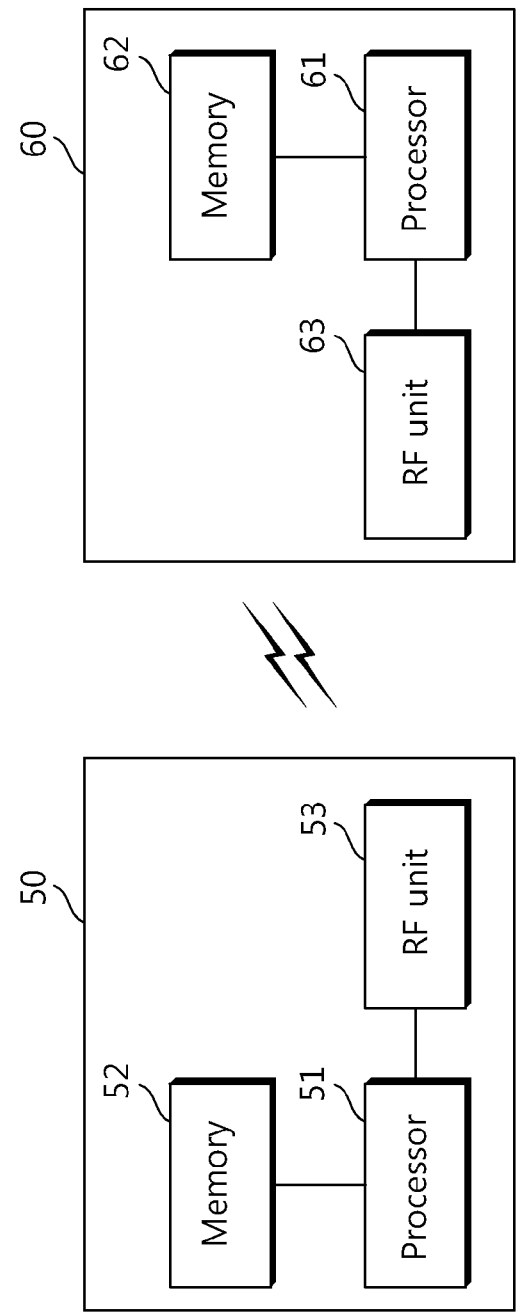
FIG. 15 is a block diagram of a wireless communication system according to an embodiment of the present invention.

FIG. 15 is a block diagram of a wireless communication system according to an embodiment of the present invention.

A BS 50 includes a processor 51, a memory 52, and a radio frequency (RF) unit 53. The memory 52 is coupled to the processor 51, and stores a variety of information for driving the processor 51. The RF unit 53 is coupled to the processor 51, and transmits and/or receives a radio signal. The processor 51 may configure an EPDCCH search space in one or more PRB pairs, and may transmit an EPDCCH, a URS, a DM RS, and/or a PDSCH.

A wireless device 60 includes a processor 61, a memory 62, and an RF unit 63. The memory 62 is coupled to the processor 61, and stores a variety of information for driving the processor 61. The RF unit 63 is coupled to the processor 61, and transmits and/or receives a radio signal. The processor 61 implements the proposed functions, procedures, and/or methods. The processor 61 may monitor an EPDCCH in an EPDCCH search space. The processor 61 may receive an EPDCCH, a URS, a DM RS, and/or a PDSCH. The processor 61 may perform an operation of the wireless device in the embodiment of FIG. 14.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method of receiving data in a wireless communication system, the method performed by a wireless device and comprising:
    monitoring a downlink control channel;
    determining to use a fallback mode instead of a pre-configured mode if the wireless device is configured with the pre-configured mode but is unable to use the pre-configured mode;
    receiving control information on an allocation of a downlink resource through the downlink control channel according to the fallback mode;
    determining whether the control information includes a field indicating information related to a radio resource of a downlink reference signal according to the fallback mode;
    self-determining a spreading factor based on a number of downlink control channels in a Physical Resource Block (PRB) pair or a number of antenna ports according to the fallback mode if it is determined that the control information does not include the field;
    receiving a downlink reference signal for demodulating a downlink transmission block based on a spreading sequence according to the spreading factor; and
    receiving the downlink transmission block through a downlink shared channel based on the allocation of the downlink resource,
    wherein the pre-configured mode specifies a first format of the control information that includes the field; and
    wherein the fallback mode specifies a second format of the control information that does not include the field.

2. The method of claim 1, wherein the downlink control channel is monitored in a search space defined by the PRB pair.

3. The method of claim 2, wherein a radio resource of the downlink reference signal is determined in association with the search space.

4. The method of claim 2, wherein monitoring the downlink control channel is performed in units of an aggregation level having one or more enhanced control channel elements (ECCEs).

5. The method of claim 3, wherein the radio resource of the downlink reference signal is determined in association with an enhanced control channel element (ECCE) in which the downlink control channel is detected.

6. A wireless device in a wireless communication system, the wireless device comprising:
    a radio frequency (RF) unit configured to transmit and receive a radio signal; and
    a processor operatively coupled to the RF unit and configured to:
    monitor a downlink control channel;
    determine to use a fallback mode instead of a pre-configured mode if the wireless device is configured with the pre-configured mode but is unable to use the pre-configured mode;
    receive control information on an allocation of a downlink resource through the downlink control channel according to the fallback mode;
    determine whether the control information includes a field indicating information related to a radio resource of a downlink reference signal according to the fallback mode;
    self-determine a spreading factor based on a number of downlink control channels in a Physical Resource Block (PRB) pair or a number of antenna ports according to the fallback mode if it is determined that the control information does not include the field;
    receive a downlink reference signal for demodulating a downlink transmission block based on a spreading sequence according to the spreading factor; and
    receive the downlink transmission block through a downlink shared channel based on the allocation of the downlink resource,
    wherein the pre-configured mode specifies a first format of the control information that includes the field; and
    wherein the fallback mode specifies a second format of the control information that does not include the field.

7. The wireless device of claim 6, wherein the downlink control channel is monitored in a search space defined by the PRB pair.

8. The wireless device of claim 7, wherein a radio resource of the downlink reference signal is determined in association with the search space.

9. The wireless device of claim 7, wherein monitoring the downlink control channel is performed in units of an aggregation level having one or more enhanced channel elements (ECCEs).

10. The wireless device of claim 8, wherein the radio resource of the downlink reference signal is determined in association with an enhanced control channel element (ECCE) in which the downlink control channel is detected.

* * * * *